(12) United States Patent
Blados et al.

(10) Patent No.: US 12,076,812 B2
(45) Date of Patent: Sep. 3, 2024

(54) METHODS AND SYSTEMS FOR MONITORING A TEMPERATURE OF A COMPONENT DURING A WELDING OPERATION

(71) Applicant: BWXT Nuclear Operations Group, Inc., Lynchburg, VA (US)

(72) Inventors: Jonathan A. Blados, North Canton, OH (US); Steven W. Liston, Mogadore, OH (US); Matthew E. Smith, Smithville, OH (US); Allan W. Springer, Ravenna, OH (US); David A. Wilson, Canal Fulton, OH (US); William P. Johns, Stow, OH (US)

(73) Assignee: BWXT Nuclear Operations Group, Inc., Lynchburg, VA (US)

( * ) Notice: Subject to any disclaimer, the term of this patent is extended or adjusted under 35 U.S.C. 154(b) by 0 days.

(21) Appl. No.: 17/554,906

(22) Filed: Dec. 17, 2021

(65) Prior Publication Data
US 2022/0105591 A1   Apr. 7, 2022

Related U.S. Application Data

(63) Continuation of application No. 16/017,558, filed on Jun. 25, 2018, now Pat. No. 11,213,912.

(51) Int. Cl.
*B23K 26/03*   (2006.01)
*B23K 9/095*   (2006.01)
*B23K 9/10*   (2006.01)
*B23K 11/25*   (2006.01)

(52) U.S. Cl.
CPC .......... *B23K 26/034* (2013.01); *B23K 9/0956* (2013.01); *B23K 9/1062* (2013.01); *B23K 11/252* (2013.01)

(58) Field of Classification Search
CPC .... B23K 37/0538; B23K 26/034; B23K 5/08; B23K 9/1062; B23K 9/0956; B23K 5/006; B23K 5/22; B23K 11/252; B23K 2101/06; B23K 7/006; C23C 26/02
USPC .................. 219/76.1, 110; 118/47, 668, 690; 148/195, 196; 266/54, 57; 427/10
See application file for complete search history.

(56) References Cited

U.S. PATENT DOCUMENTS

| | | | |
|---|---|---|---|
| 1,539,383 A * | 5/1925 | Bienenstok | B23K 37/02 219/124.4 |
| 1,907,702 A | 5/1933 | Anderson | |
| 1,915,946 A | 6/1933 | Ost | |
| 1,956,824 A | 5/1934 | Deming | |
| 1,981,850 A | 11/1934 | Fisher | |
| 1,994,700 A | 3/1935 | Halbing | |
| 2,002,877 A | 5/1935 | Barrington | |
| 2,036,732 A | 4/1936 | Wall | |
| 2,047,305 A | 7/1936 | Bell | |
| 2,047,306 A | 7/1936 | Brookins | |
| 2,054,971 A | 9/1936 | Fausek | |

(Continued)

*Primary Examiner* — Eric S Stapleton
(74) *Attorney, Agent, or Firm* — Nelson Mullins Riley & Scarborough LLP

(57) ABSTRACT

A method of monitoring a heating operation on a component by a flame torch, including the steps of producing a flame with the flame torch, rotating the component with respect to the flame so that a circular weld is created on the component, and providing a first sensor that is operatively engaged with the component so that the first sensor monitors rotation or non-rotation of the components.

20 Claims, 3 Drawing Sheets

(56) References Cited

U.S. PATENT DOCUMENTS

| | | | | |
|---|---|---|---|---|
| 2,102,259 | A | 12/1937 | Edwards | |
| 2,182,796 | A | 12/1939 | Deming | |
| 2,196,180 | A | 4/1940 | Anderson | |
| 2,229,405 | A | 1/1941 | Currier | |
| 2,282,508 | A | 5/1942 | Anderson | |
| 2,384,740 | A | 9/1945 | Heckethorn | |
| 2,392,824 | A | 1/1946 | Lytle | |
| 2,497,853 | A | 2/1950 | Arnold | |
| 2,705,629 | A | 4/1955 | Miller | |
| 2,726,615 | A | 12/1955 | Downing | |
| 2,734,478 | A | 2/1956 | Reynolds et al. | |
| 2,762,621 | A | 9/1956 | Zumwalt | |
| 2,847,204 | A | 8/1958 | Menser | |
| 2,867,541 | A | 1/1959 | Coghill | |
| 3,024,354 | A | 3/1962 | Mierendorf | |
| 3,123,657 | A | 3/1964 | Clark, Jr. et al. | |
| 3,153,109 | A | 10/1964 | Steventon | |
| 3,196,248 | A * | 7/1965 | Cooper | B23K 9/0282 219/125.11 |
| 3,469,068 | A | 9/1969 | Wall, Jr. | |
| 3,500,533 | A * | 3/1970 | Sparling | B23K 5/003 228/904 |
| 3,555,239 | A | 1/1971 | Kerth | |
| 3,567,899 | A | 3/1971 | Iceland | |
| 3,574,650 | A | 4/1971 | House | |
| 3,713,635 | A | 1/1973 | Strnad | |
| 3,747,911 | A | 7/1973 | Skipper | |
| 3,769,097 | A | 10/1973 | Walters | |
| 3,772,949 | A | 11/1973 | Pavone | |
| 3,773,262 | A * | 11/1973 | Sparling | B23K 5/006 239/291 |
| 3,804,391 | A | 4/1974 | Case | |
| 3,813,509 | A | 5/1974 | Woods | |
| 3,900,346 | A | 8/1975 | Muller | |
| 3,934,861 | A | 1/1976 | Rahall | |
| 3,936,714 | A | 2/1976 | Marshall | |
| 3,980,126 | A * | 9/1976 | Eberle | H01M 50/529 164/271 |
| 3,980,857 | A | 9/1976 | Sciaky | |
| 3,995,073 | A * | 11/1976 | Kuonen | C23C 26/02 219/76.1 |
| 4,014,495 | A | 3/1977 | Oda | |
| 4,014,528 | A | 3/1977 | Sugiyama | |
| 4,033,402 | A * | 7/1977 | Eberle | B22D 25/04 164/334 |
| 4,046,100 | A | 9/1977 | Kuonen | |
| 4,050,501 | A * | 9/1977 | Eberle | B23K 37/06 164/91 |
| 4,052,039 | A | 10/1977 | Koyano | |
| 4,100,310 | A | 7/1978 | Ura | |
| 4,119,137 | A * | 10/1978 | Eberle | B23K 37/06 228/49.5 |
| 4,135,701 | A | 1/1979 | Light, Jr. | |
| 4,143,862 | A | 3/1979 | Krieg | |
| 4,148,467 | A | 4/1979 | Sargeant | |
| 4,157,814 | A * | 6/1979 | Miller | B23K 7/107 266/70 |
| 4,168,056 | A | 9/1979 | Haley | |
| 4,216,945 | A | 8/1980 | Krieg | |
| 4,219,370 | A | 8/1980 | Hoaglin | |
| 4,296,146 | A | 10/1981 | Penn | |
| 4,384,901 | A | 5/1983 | Swoboda, III | |
| 4,404,450 | A * | 9/1983 | Weldon | B23K 9/048 219/76.1 |
| 4,414,041 | A | 11/1983 | Rusk | |
| 4,456,228 | A | 6/1984 | Cable | |
| 4,480,821 | A | 11/1984 | Noll | |
| 4,483,721 | A | 11/1984 | Hearn | |
| 4,485,960 | A | 12/1984 | Sagan | |
| 4,592,921 | A | 6/1986 | Hieber | |
| 4,604,511 | A | 8/1986 | Grosse-Wordemann | |
| 4,621,792 | A | 11/1986 | Thurston | |
| 4,649,426 | A | 3/1987 | Bolstad | |
| 4,810,966 | A | 3/1989 | Schmall | |
| 4,940,879 | A | 7/1990 | De-Swaan | |
| 5,079,404 | A | 1/1992 | Zamuner | |
| 5,298,966 | A | 3/1994 | Berman | |
| 5,360,201 | A | 11/1994 | Balentine | |
| 5,391,144 | A | 2/1995 | Sakurai | |
| 5,443,199 | A | 8/1995 | Krumszyn | |
| 5,511,765 | A | 4/1996 | Shippen | |
| 5,584,426 | A | 12/1996 | Ziesenis | |
| 5,598,729 | A | 2/1997 | Hoffmann | |
| 5,798,627 | A | 8/1998 | Gilliland | |
| 5,824,983 | A | 10/1998 | Huddleston, Jr. | |
| 5,853,655 | A * | 12/1998 | Baker | B23K 5/08 266/73 |
| 5,961,855 | A | 10/1999 | Hewett | |
| 6,022,506 | A | 2/2000 | Simmons | |
| 6,105,396 | A | 8/2000 | Glodis | |
| 6,335,508 | B1 | 1/2002 | Nam | |
| 6,532,773 | B1 | 3/2003 | Mazzarese | |
| 6,534,973 | B1 | 3/2003 | Sport | |
| 6,795,778 | B2 | 9/2004 | Dodge | |
| 6,903,300 | B2 | 6/2005 | Faust | |
| 7,163,388 | B2 | 1/2007 | Anand et al. | |
| 7,552,856 | B2 | 6/2009 | Nagano | |
| 7,992,473 | B2 | 8/2011 | Marple | |
| 8,450,643 | B2 | 5/2013 | Nachbargauer | |
| 8,683,841 | B1 | 4/2014 | Walsh | |
| 8,704,120 | B2 | 4/2014 | Larsson | |
| 8,961,006 | B2 | 2/2015 | Gleitman | |
| 9,102,002 | B1 | 8/2015 | Jusionis | |
| 10,500,664 | B2 | 12/2019 | Gomez | |
| 10,780,518 | B2 | 9/2020 | Amaro-Barboza | |
| 11,213,912 | B2 * | 1/2022 | Blados | B23K 9/1062 |
| 2002/0144776 | A1 | 10/2002 | Bonnell | |
| 2003/0000931 | A1 | 1/2003 | Jeda | |
| 2003/0109193 | A1 | 6/2003 | Schmall | |
| 2004/0107734 | A1 | 6/2004 | Kenkare | |
| 2005/0224467 | A1 | 10/2005 | Val | |
| 2006/0163227 | A1 * | 7/2006 | Hillen | B23K 9/095 219/130.21 |
| 2008/0243306 | A1 | 10/2008 | Koike | |
| 2008/0308190 | A1 * | 12/2008 | Brunson | B23K 7/107 148/201 |
| 2010/0003904 | A1 | 1/2010 | Duescher | |
| 2010/0051586 | A1 | 3/2010 | Guerrina | |
| 2010/0072261 | A1 * | 3/2010 | Cruz | B23K 20/123 228/2.1 |
| 2011/0006047 | A1 * | 1/2011 | Penrod | G09B 25/02 434/234 |
| 2011/0079339 | A1 | 4/2011 | Cruz | |
| 2011/0174792 | A1 | 7/2011 | Gelmetti | |
| 2011/0220619 | A1 | 9/2011 | Mehn | |
| 2011/0247998 | A1 | 10/2011 | Nachbargauer | |
| 2012/0096702 | A1 | 4/2012 | Kingsley | |
| 2012/0168033 | A1 * | 7/2012 | Heuer | C23C 8/26 148/400 |
| 2013/0342678 | A1 | 12/2013 | McAninch | |
| 2014/0231415 | A1 | 8/2014 | Verhagen | |
| 2014/0265047 | A1 * | 9/2014 | Burris | B23K 26/034 264/497 |
| 2015/0041454 | A1 | 2/2015 | Foret | |
| 2015/0048059 | A1 | 2/2015 | Kurosawa | |
| 2015/0190875 | A1 | 7/2015 | Becker | |
| 2015/0190876 | A1 | 7/2015 | Becker | |
| 2015/0194072 | A1 | 7/2015 | Becker | |
| 2015/0194073 | A1 | 7/2015 | Becker | |
| 2015/0283640 | A1 | 10/2015 | Walker | |
| 2015/0290735 | A1 | 10/2015 | Beattie | |
| 2015/0334780 | A1 | 11/2015 | Beistle | |
| 2015/0334781 | A1 | 11/2015 | Verhagen | |
| 2015/0334782 | A1 | 11/2015 | Garvey | |
| 2015/0334783 | A1 | 11/2015 | Mlnarik | |
| 2015/0334784 | A1 | 11/2015 | Carter | |
| 2015/0375324 | A1 | 12/2015 | Becker | |
| 2015/0375327 | A1 | 12/2015 | Becker | |
| 2015/0379894 | A1 | 12/2015 | Becker | |
| 2016/0014850 | A1 | 1/2016 | Verhagen | |
| 2016/0018812 | A1 * | 1/2016 | Martin | B23K 5/00 700/114 |

(56) References Cited

U.S. PATENT DOCUMENTS

| | | |
|---|---|---|
| 2016/0039034 A1 | 2/2016 | Becker |
| 2016/0039053 A1 | 2/2016 | Becker |
| 2016/0101481 A1 | 4/2016 | Holverson |
| 2016/0125592 A1 | 5/2016 | Becker |
| 2016/0125593 A1 | 5/2016 | Becker |
| 2016/0125594 A1 | 5/2016 | Becker |
| 2016/0125762 A1 | 5/2016 | Becker |
| 2016/0125763 A1 | 5/2016 | Becker |
| 2016/0168480 A1 | 6/2016 | Spicer |
| 2016/0263710 A1 | 9/2016 | Yoshida |
| 2016/0288236 A1 | 10/2016 | Becker |
| 2017/0046974 A1 | 2/2017 | Becker |
| 2017/0046975 A1 | 2/2017 | Becker |
| 2017/0046976 A1 | 2/2017 | Becker |
| 2017/0046977 A1 | 2/2017 | Becker et al. |
| 2017/0190049 A1 | 7/2017 | Wada |
| 2017/0219205 A1 | 8/2017 | Eiseman |
| 2018/0001422 A1* | 1/2018 | Rajagopalan ........ B23K 26/282 |
| 2018/0154480 A1* | 6/2018 | Bai ........................ B33Y 50/02 |
| 2019/0388999 A1* | 12/2019 | Blados ................. B23K 9/0956 |

* cited by examiner

METHODS AND SYSTEMS FOR MONITORING A TEMPERATURE OF A COMPONENT DURING A WELDING OPERATION

CROSS-REFERENCE TO RELATED APPLICATION

This is a continuation of U.S. patent application Ser. No. 16/017,558 filed on Jun. 25, 2018, now U.S. Pat. No. 11,213,912, which disclosure is hereby incorporated by reference in its entirety.

FIELD OF THE INVENTION

The present invention relates generally to heating operations that facilitate welding operations to meet specification requirements. More particularly, the present invention relates to systems and methods of monitoring heating operations that facilitate welding operations to meet specification requirements.

BACKGROUND OF THE INVENTION

To help insure even heat distribution and weld creation on cylindrical components, it is known to rotate the component with regard to the welding assembly as the weld is created. Current methods for verifying and controlling the temperature of the component in the vicinity of the weld while under flame heating typically require the use of temperature crayons and/or pyrometers that are placed in direct contact with the surface of the component. Based on the information gathered by the temperature crayons and/or pyrometers, an operator adjusts the flame intensity of the welding assembly by manually adjusting the flow of fuel (i.e., natural gas, etc.) from its fuel source. Checking component temperatures and the corresponding adjustment of the welding flame typically occur a finite number of times over the time interval required for the creation of the weld. For example, temperature verification may occur hourly, bi-hourly, etc., during weld creation. This infrequent temperature verification and welding flame adjustment can lead to temperature excursions in the weld zone that are both above and/or below temperature set points that are required per specification requirements and, therefore, approval of the component for its intended use. Additionally, if rotation of the component during welding ceases and goes unnoticed by the operator, localized overheating may occur which can lead to the component being damaged to the extent that it cannot meet prescribed standards for its desired use.

Such welding operations typically include a "preheat stage" prior to creation of the weld, as well as a "post-bake stage" after weld creation. The preheat stage is required to bring the temperature of the component up to a minimum temperature limit at which weld creation can be commenced. In the post-bake stage the component temperature is elevated to a predetermined amount above the temperature at which the weld is created to help insure hydrogen is diffused from the weld and surrounding base material, helping to prevent hydrogen cracking. It is important that temperature excursions beyond the upper and lower temperature set points are prevented during all three phases of the weld operation.

The present invention recognizes and addresses considerations of prior art constructions and methods.

SUMMARY OF THE INVENTION

One embodiment of the present disclosure provides a method of monitoring a heating operation on a component by a flame torch, including the steps of producing a flame with the flame torch, rotating the component with respect to the flame so that a circular weld is created on the component, and providing a first sensor that is operatively engaged with the component so that the first sensor monitors rotation or non-rotation of the components.

Another embodiment of the present disclosure provides a method of monitoring a heating operation on a component by a flame torch, comprising the steps of producing a flame with the flame torch, rotating the component with the respect to the flame so that a circular weld is created on the component, and providing a first sensor that is operatively engaged with the component so that the first sensor monitor a temperature of the component in a vicinity of the circular weld.

Another embodiment of the present disclosure provides a system for monitoring a heating operation on a component by a flame torch, the system including a first sensor that is operatively engaged with the component, the first sensor being configured to detect rotation or non-rotation of the component and produce a first electrical signal that is indicative of the rotation or non-rotation of the component. A second sensor is operatively engaged with the component and is configured to detect a temperature of the component and produce a second electrical signal that is indicative of the temperature of the component. A processor is configured to both receive the first electrical signal and produce an audible alarm based on the first electrical signal indicating non-rotation of the component, and receive the second electrical signal and produce an audible alarm when the temperature of the component is greater than a pre-determined temperature value.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
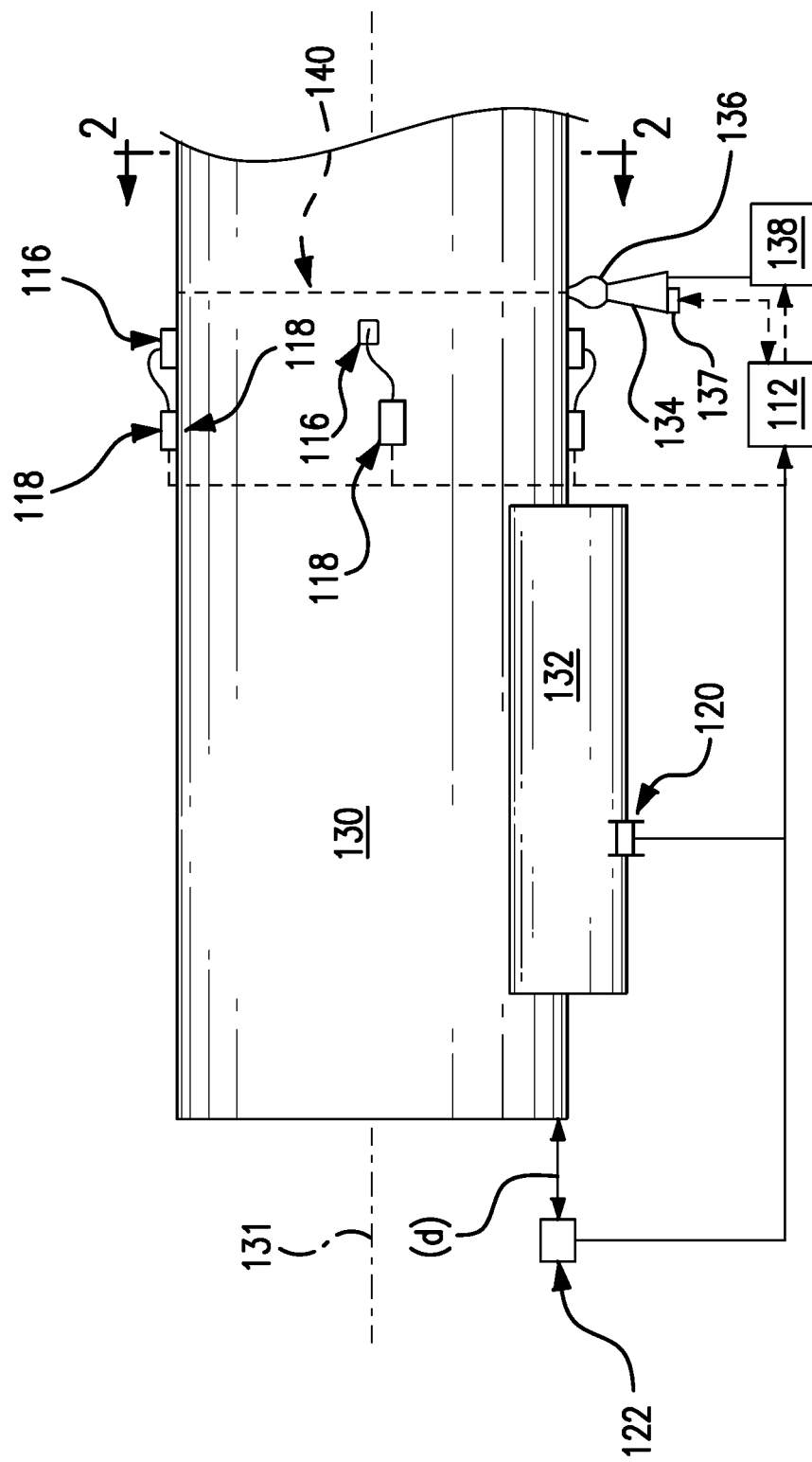
FIG. 1 is a schematic view of an embodiment of a system for monitoring a heating operation on a component in accordance with the present disclosure.

Repeat use of reference characters in the present specification and drawings is intended to represent same or analogous features or elements of the invention according to the disclosure.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 2:
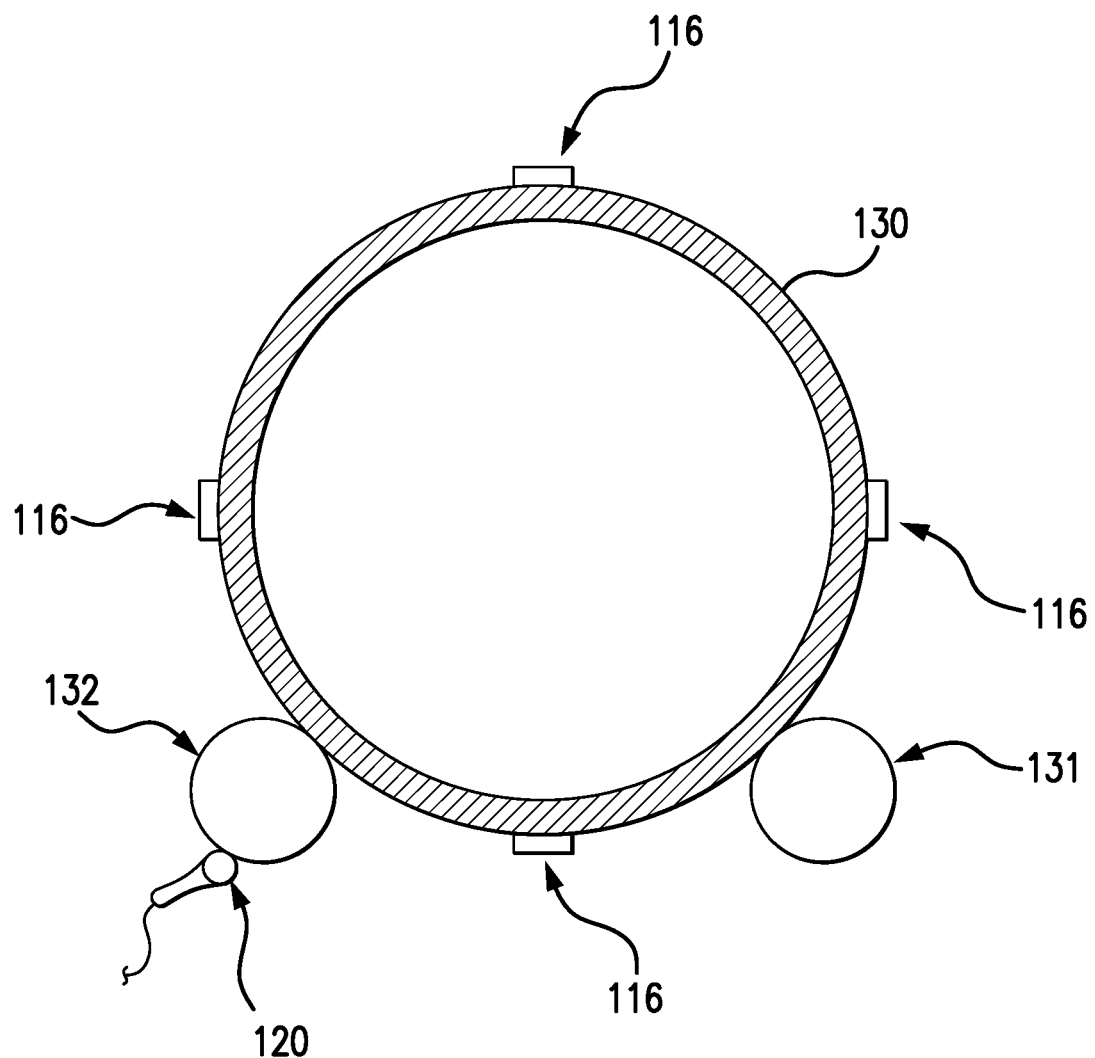
FIG. 2 is a cross-sectional view of the system for monitoring a heating operation shown in FIG. 1, taken along line 2-2.

Referring now to the figures, as shown in FIGS. 1 and 2, an embodiment of a welding system in accordance with the present disclosure includes a programmable logic controller 112, a plurality of temperature sensors 116 for determining temperatures of a welded component 130, a rotation sensor 120 for determining whether or not the component is being rotated, an ultrasonic sensor 122 for determining component creep, and a flame torch assembly 134 including a flame sensor 137. Preferably, programmable logic controller 112 monitors component temperatures, the status of the flame, rotation of the welded component, and component creep relative to its longitudinal center axis. However, in alternate embodiments, more than one programmable logic controller may be used to monitor these functions.

When creating a circular weld on a cylindrical component 130, component 130 is rotated to help insure even heating of the component surface and even deposition of weld material along circular weld 140. As such, component 130 is supported on multiple rollers, as best seen in FIG. 2. In the instant case, component 130 is supported on a drive roller 131 and an idler roller 132. Preferably, rotation sensor 120 is placed in rolling engagement with idler roller 132. An example rotation sensor 120 is a magnetic encoder device, such as Model No. Z001000A, manufactured by Red Lion, that allows programmable logic controller 112 to recognize the status of rotation of component 130 on rollers 131 and 132. Specifically, programmable logic controller 112 utilizes the signal from the magnetic encoder to determine a binary result, which is indicative of whether or not rotation sensor 120 detects rotation of idler roller 132. Rotation sensor 120 is preferably placed in contact with idler roller 132 because idler roller 132 only rotates when component 130 is rotating. In contrast, if rotation sensor 120 is operatively engaged with drive roller 131, it is possible that the sensor would appear to indicate rotation of component 130 as it would actually be monitoring rotation of drive roller 131, even if slippage is occurring between drive roller 131 and component 130. Note, however, in alternate embodiments a rotation sensor can be placed in operative engagement with both idler roller 132 and component 130. Upon an indication from rotation sensor 120 that component 130 is not rotating, programmable logic controller 112 creates both an audible and visual alarm to indicate that operator intervention is required.

Referring now to FIG. 1, an ultrasonic sensor 122 is used to monitor axial movement, or creep, of component 130 on drive roller 131 and idler roller 132 relative to a longitudinal center axis 131 of component 130. Preferably, ultrasonic sensor 122 is placed a predetermined distance (d) from an end of component 130. As component 130 is rotated, ultrasonic sensor 122 monitors a distance between itself and the end of component 130. If the distance between ultrasonic sensor 122 and component 130 deviates from predetermined distance (d) by a selected amount, programmable logic controller 112 provides an audible and visual alarm to indicate that operator intervention may be required. Preventing component creep is important during welding operations to insure not only that the component being welded is not damaged, such as by falling off the rollers, but to also insure that various monitoring devices disposed on the component, such as temperature sensors 116 are not damaged, as discussed in greater detail below.

As best seen in FIG. 1, temperature sensors 116 are secured to the surface of component 130 adjacent circular weld 140. Preferably, each temperature sensor 116 is a K-type thermocouple that is secured to the outer surface of component 130 by a corresponding magnet. Note, however, temperature sensors 116 may be secured to component by tack welding, epoxies, etc., in alternate embodiments. Each temperature sensor 116 is connected to a corresponding wireless transmitter 118 that transmits the sensor's temperature measurements to programmable logic controller 112. An example of wireless transmitter 118 is Model No. UWTC-2, manufactured by Omega Engineering. The positions of both temperature sensors 116 and wireless transmitters 118 on the component are selected so that they will not be damaged by drive roller 131 and idler roller 132. Additionally, each temperature sensor 116 is covered with a layer of insulation material so that the temperature sensors measure the temperature of component 130 in the vicinity of circular weld 140 and not the temperature of welding flame 136.

Wireless transmitters 118 allow component 130 to be rotated without having to account for the wires that would otherwise connect temperature sensors 116 to programmable logic controller 112. Wireless transmitters 118 are battery powered, and are preferably uniquely addressed to the programmable logic controller. By uniquely addressing each wireless transmitter 118 to the programmable logic controller, no cross-communication will occur in the event that multiple welding operations are being simultaneously monitored in close proximity to each other. Preferably, a human machine interface (HMI) or personal computer (PC) (not shown) interfaces with programmable logic controller 112 and maintains the history of the component temperatures as measured by temperature sensors 118 over the duration of the welding operation, including both preheat and post-bake stages. The temperature history facilitates determination of whether or not a component may be cleared for its intended use in the event that a temperature excursion does occur during the welding operation.

Still referring to FIG. 1, flame torch assembly 134 includes a fuel source 138, such as natural gas, and flame sensor 137 for determining the presence or absence of welding flame 136 during welding operations. An example of flame sensor 137 is Model No. 39F95, manufactured by Lennox. Flame sensor 137 provides a signal to programmable logic controller 112 that indicates whether flame 136 is present. As discussed in greater detail below, programmable logic controller 112 uses this information to either initiate an automatic ignition sequence for flame torch assembly 134, or in the case of multiple failed ignition sequences, to secure the flow of fuel from fuel source 138 to flame torch assembly 134. Securing the flow of fuel from fuel source 138 prevents the inadvertent buildup of fuel should flame 136 become unintentionally extinguished. Note, flame torch assembly 134 preferably includes multiple flames (i.e., eight or more) that are typically arranged in a semi-circular configuration.

Figure 3:
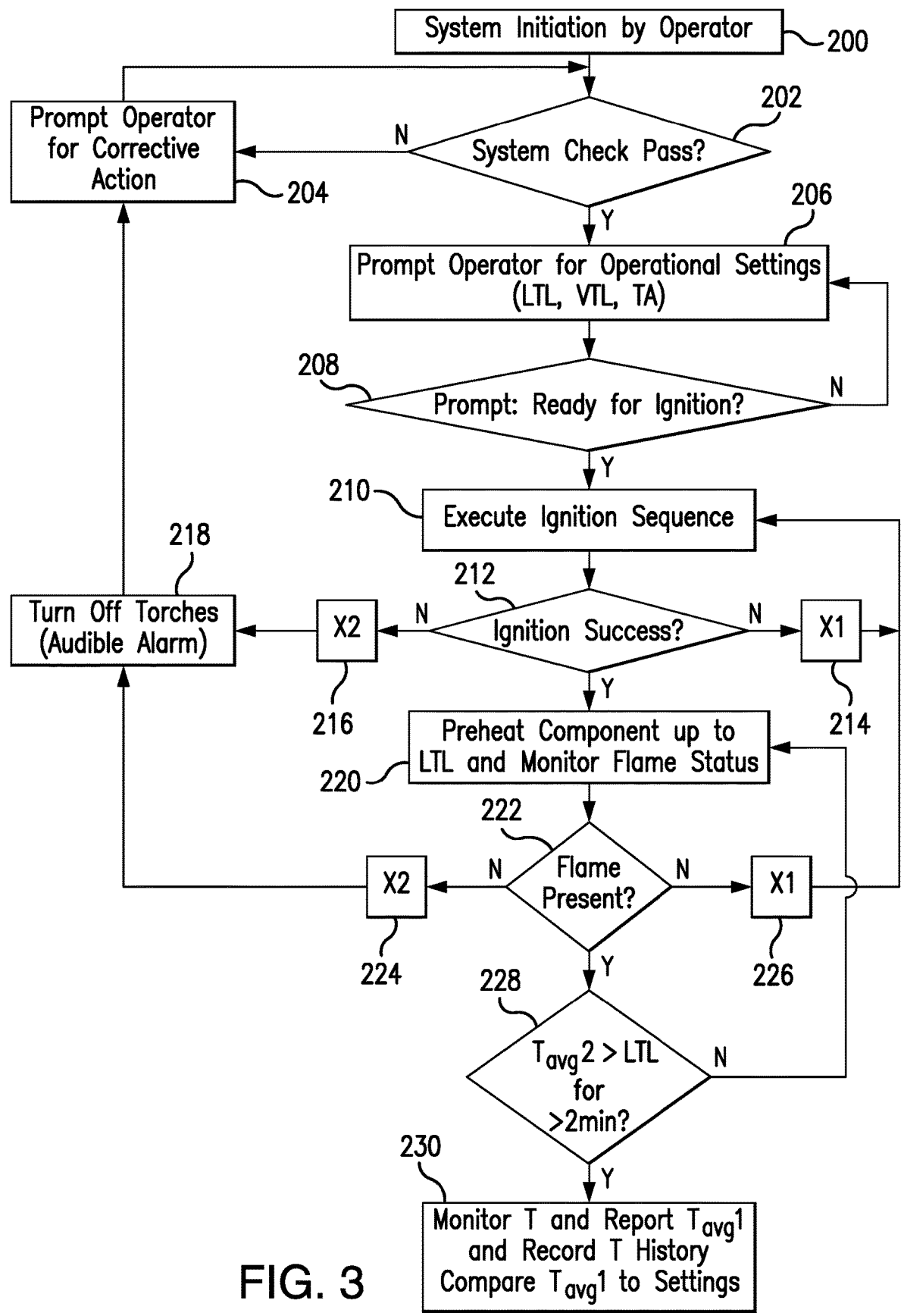
FIG. 3 is a flow chart showing an ignition sequence of a flame torch of the heating system shown in FIGS. 1 and 2.

Referring now to FIG. 3, an example of a heating operation utilizing the disclosed heating system is discussed. First, the operator initiates the heating operation by way of programmable logic controller 112, step 200. Next, the programmable logic controller performs a system check, step 202. Specifically, programmable logic controller 112 determines if rotation of component 130 is detected and whether ultrasonic sensor 122 is active. Programmable logic controller 112 verifies that signals are being received from wireless transmitters 118 and that fuel pressure is detected at flame torch assembly 134. If any of these checks are negative, the programmable logic controller prompts the operator for corrective action, step 204. If the system check is positive, programmable logic controller 112 prompts the operator for operational settings, step 206. In the present case, the operational settings include a lower temperature limit (LTL) and an upper temperature limit (UTL) that are not to be violated during the welding operation. Additionally, a value of the thermocouple accuracy (TA) is entered for use in determine warning ranges that are used during the welding operation. Specifically, green, yellow and red visual warnings are provided by programmable logic controller 112, with each visual indication corresponding to various temperature ranges of the components surface. For example, for a welding operation in which LTL=200° F. and UTL=650° F., a range of temperatures for which a green visual indication is provided is determined by the equation LTL+TA+50°<L Tavg2<UTL−TA−50° F., where the 50° value is a safety buffer selected by the operator and Tavg2 is determined by rejecting the highest reading of the flow temperature sensors 116 and averaging the remaining three readings. The resultant range is 275° to 575° F. A range of temperatures for which a yellow visual indication is provided is determined by the equation LTL+TA<Tavg2<UTL−TA. The resultant temperature ranges for which a yellow visual indication is provided is 225° to 275° F. and 575° to 625° F. A red visual indication is provided when Tavg2 comes within the value of the thermocouple accuracy (TA) of the LTL and UTL. Note, audible warnings may also be provided in additional to the green, yellow and red visual indications.

After operational settings have been entered, programmable logic controller 112 prompts the operator for approval to initiate the ignition sequence of flame torch assembly 134, step 208. Once approval is received, programmable logic controller 112 executes an ignition sequence in which fuel is provided to flame torch assembly 136 from fuel source 138 and a direct spark ignition system is activated. Note, a pilot flame may be utilized rather than a direct spark ignition system so that flame 136 is created upon the initiation of flow of fuel to flame torch assembly 134. Next, programmable logic controller 112 determines whether flame 136 has been successfully ignited, step 212, as determined by input from flame sensor 137. If flame 136 is not present, programmable logic controller 112 will execute the ignition sequence another time, step 214. If after two attempts, step 216, flame 136 is not present, first programmable logic control 112 secures the flow of fuel to torch assembly 134, step 218, and prompts the operator for corrective action, step 204.

Once the ignition sequence is determined to be successful and flame 136 is produced, a preheat stage commences in which the area of component 130 to be welded is brought up to the lower temperature limit (LTL), step 220. During the preheat stage of component 130, the status of flame 136 is continuously monitored, step 222. As before, if programmable logic controller 112 determines that flame 136 is not present based on input from flame sensor 137, the controller will automatically execute the ignition sequence, steps 226 and 210. If flame 136 is not established after two ignition sequence attempts, step 224, programmable logic controller 112 will automatically secure the flow of fuel to flame torch assembly 134, step 218, and prompt the operator for corrective action, step 204. If flame 136 remains established during the preheat stage, and Tavg2 is greater than LTL for greater than two minutes, step 228, the welding stage will commence.

During the welding stage, programmable logic controller 112 monitors the plurality of temperature sensors 116 and determines Tavg1, which is the average of the readings of all the temperature sensors, step 230. Programmable logic controller 112 records the temperature history of component 130 and compares Tavg1 to the above-described temperature ranges that are used to determine whether programmable logic controller 112 provides a green, yellow or red visual indication. As well, programmable logic controller 112 utilizes Tavg1 to automatically adjust the intensity of flame 136 by way of adjusting the flow of fuel to flame torch assembly. As such, programmable logic controller 112 maintains component temperatures within the prescribed limits during the welding operation. Programmable logic controller 112 continues to monitor the plurality of temperature sensors 118 and record the temperature history continuously during the welding stage as well as the post-bake stage, at which point the welding operation is completed.

While one or more preferred embodiments of the invention are described above, it should be appreciated by those skilled in the art that various modifications and variations can be made in the present invention without departing from the scope and spirit thereof. It is intended that the present invention cover such modifications and variations as come within the scope and spirit of the appended claims and their equivalents.

The invention claimed is:

1. A system for monitoring a heating operation on a component by a flame torch, the system comprising:
    a first sensor that is operatively engaged with the component, the first sensor being configured to detect rotation or non-rotation of the component and produce a first electrical signal that is indicative of the rotation or non-rotation of the component;
    a second sensor that is operatively engaged with the component, the second sensor being configured to detect a temperature of the component and produce a second electrical signal that is indicative of the temperature of the component;
    a processor that is configured to receive the first electrical signal and produce an audible alarm based on the first electrical signal indicating non-rotation of the component, and receive the second electrical signal and produce an audible alarm when the temperature of the component is greater than a pre-determined temperature value; and
    a third sensor that is configured to detect a presence or an absence of a flame and produce a third signal that is indicative of the presence or the absence of the flame, wherein the processor is configured to receive the third electrical signal and produce an audible alarm based on the third electrical signal indicating the absence of the flame.

2. A method of monitoring a heating operation on a component by a heat source, comprising the steps of:
    attaching at least one temperature sensor to an outer surface of the component adjacent to a location at which a circumferential weld is to be produced;
    producing heat at the component using the heat source;
    causing rotation of the component with the respect to the heat source so that the weld is produced on the component while the at least one sensor rotates with the component; and
    monitoring data based on an output of the at least one temperature sensor during a time in which the weld is being produced.

3. The method of claim 2, in which the at least one temperature sensor comprises a plurality of temperature sensors mounted at spaced apart locations about the outer surface of the component.

4. The method of claim 3, wherein each of the plurality of temperature sensors comprises a thermocouple.

5. The method of claim 4, wherein each of the plurality of temperature sensors communicates wirelessly with an external controller so that the monitoring can be performed.

6. The method of claim 4, wherein the attaching involves attaching respective of the plurality of temperature sensors to the component via magnetic attachment.

7. The method of claim 2, wherein the monitoring data involves monitoring data during preheat, weld creation, and post-bake phases of production of the circumferential weld.

8. The method of claim 7, further comprising at least one of monitoring an audible alarm and observing a visual indicator.

9. The method of claim 2, further comprising steps of:
providing at least one rotation sensor to detect rotation of the component; and
providing an indication if non-rotation of the component is detected.

10. The method of claim 9, wherein the component is cylindrical and the at least one rotation sensor is operatively connected to the component.

11. The method of claim 10, wherein the at least one rotation sensor engages a roller that rotatably supports the component.

12. The method of claim 11, wherein the roller comprises an idler roller.

13. The method of claim 2, wherein the heat source comprises a flame torch producing heat via flame.

14. The method of claim 13, further comprising steps of:
providing a flame sensor operative to detect the flame; and
providing an indication if an absence of flame is detected.

15. The method of claim 14, further comprising:
controlling output of the flame torch based on a temperature of the component.

16. The method of claim 2, further comprising:
providing at least one sensor operative to measure data regarding axial position of the component; and
providing an indication if excessive axial movement of the component is detected.

17. A welding apparatus comprising:
a support structure on which a component to be welded is received, said support structure being operative to rotate the component during welding;
a flame torch operative to produce a flame that heats a location on the component at which a circumferential weld is to be produced;
at least one temperature sensor attachable to an outer surface of the component adjacent to the location at which the weld is to be produced to rotate with the component; and
a controller operative to communicate with the at least one temperature sensor during a time in which the weld is being produced,
wherein the at least one temperature sensor comprises a plurality of temperature sensors each having a thermocouple, and
wherein the plurality of temperature sensors each include a magnet for attachment to the outer surface of the component.

18. The apparatus of claim 17, further comprising wireless transmission circuitry operative to provide temperature data wirelessly from the plurality of temperature sensors to the controller.

19. The apparatus of claim 17, further comprising at least one of an audible alarm and a visual indicator.

20. The apparatus of claim 17, further comprising at least one of at least one rotation sensor to detect rotation of the component, a flame sensor operative to detect the flame, and at least one sensor operative to determine axial position of the component.

* * * * *